US 6,726,050 B1

(12) United States Patent
Barentine et al.

(10) Patent No.: US 6,726,050 B1
(45) Date of Patent: Apr. 27, 2004

(54) CUTTING AND FILLET BOARD WITH DRAIN FOR REMOVABLE ATTACHMENT TO CONVENTIONAL ICE CHEST COOLERS

(76) Inventors: Robert A. Barentine, 437 Hidden Valley Rd., Wilmington, NC (US) 28409-3926; Susan G. Barentine, 437 Hidden Valley Rd., Wilmington, NC (US) 28409-3926

( * ) Notice: Subject to any disclaimer, the term of this patent is extended or adjusted under 35 U.S.C. 154(b) by 41 days.

(21) Appl. No.: 10/150,374

(22) Filed: May 17, 2002

(51) Int. Cl.[7] ............................................... B65D 21/02
(52) U.S. Cl. ................... 220/571; 220/571.1; 220/427; 220/23.86; 220/23.6; 220/915.2
(58) Field of Search ................................ 220/4.26, 4.27, 220/571, 571.1, 23.56, 23.4, 23.6, 915.1, 915.2

(56) References Cited

U.S. PATENT DOCUMENTS

| 2,547,716 | A | | 4/1951 | Murphy |
| 3,480,152 | A | | 11/1969 | Walsh |
| 3,893,569 | A | | 7/1975 | Hoch |
| 4,480,343 | A | | 11/1984 | Drach |
| 4,515,421 | A | * | 5/1985 | Steffes ........................ 312/351 |
| 4,836,403 | A | | 6/1989 | Blackman |
| 4,947,991 | A | | 8/1990 | Snell |
| 5,373,708 | A | * | 12/1994 | Dumoulin, Jr. ............ 62/457.7 |
| 5,551,558 | A | * | 9/1996 | Bureau ....................... 206/223 |
| 5,605,056 | A | | 2/1997 | Brown et al. |
| 5,730,282 | A | * | 3/1998 | Bureau ....................... 206/223 |
| 6,085,926 | A | * | 7/2000 | Weiss ....................... 220/23.86 |
| 6,550,791 | B2 | * | 4/2003 | Ramsey ................... 280/47.19 |

* cited by examiner

Primary Examiner—Joseph Man-Fu Moy
(74) Attorney, Agent, or Firm—John D. Gugliotta; P. Jeff Martin

(57) ABSTRACT

A cutting and fillet board with drain is adapted for removable attachment to a conventional IGLOO® ice chest cooler and other similar ice chest coolers. The cutting and fillet board has a planar, generally rectangular board member fabricated of a high-density polymer and includes a raised peripheral wall. The board member has a generally smooth filleting surface designed for use during cutting, cleaning, and filleting fish. An attachment means facilitates removable attachment of the board member to an upper surface of an ice chest cooler top. A pair of drainage portals facilitate drainage from the filleting surface, while drain plugs serve to prevent drainage onto the ice chest cooler top. A cutting instrument retention means provides for temporary storage of a desired cutting instrument.

13 Claims, 7 Drawing Sheets

US 6,726,050 B1

CUTTING AND FILLET BOARD WITH DRAIN FOR REMOVABLE ATTACHMENT TO CONVENTIONAL ICE CHEST COOLERS

RELATED APPLICATIONS

The present invention was first described in Disclosure Document No. 505,879 filed on Feb. 25, 2002. There are no previously filed, nor currently any co-pending applications, anywhere in the world.

BACKGROUND OF THE INVENTION

1. Field of the Invention

The present invention relates generally to cutting boards and, more particularly, to a cutting and fillet board with drain for removable attachment to conventional ice chest coolers.

2. Description of the Related Art

Many individuals enjoy catching fish while boating. Not so enjoyable, however, is the chore of cleaning the fish. Typically, after fish are caught, they are deposited within ice chest coolers or the like to be stored until the fish can be cut, cleaned, and filleted. This usually requires postponing cleaning and filleting duties until returning home after boating activities have been completed for the day. Otherwise, one is forced to setup a makeshift cutting surface on the boat in whatever space that can be acquired being ample to clean fish.

Accordingly, a need has arisen for a means by which freshly caught fish can be cut, cleaned, and filleted on a conventional ice chest cooler top while allowing for unimpeded accessibility to the cooler. The development of the cutting and fillet board with drain fulfills this need.

A search of the prior art did-not disclose any patents that read directly on the claims of the instant invention; however, the following references were considered related.

U.S. Pat. No. 2,547,716 issued in the name of E. M. Murphy discloses a foldable vending tray for ice cream cups and the like.

U.S. Pat. No. 5,605,056 issued in the name of Brown et al. discloses a portable cooler with suspended grate for ice-free storage areas.

U.S. Pat. No. 3,480,152 issued in the name of Walsh discloses a storage rack for bottles and similar receptacles which contain unstable material.

U.S. Pat. No. 3,893,569 issued in the name of Hoch describes a thermos support tray which is attachable about an automobile floor hump.

U.S. Pat. No. 4,947,991 issued in the name of Snell describes a non-skid beverage and/or food holder having two tiers.

U.S. Pat. No. 4,836,403 issued in the name of Blackman discloses a multi-use tray with provisions permitting its attachment to various objects.

U.S. Pat. No. 4,480,343 issued in the name of Drach describes a combination drain and cutting board.

Consequently, a need has been felt for a cutting and fillet board which allows one to cut and fillet fish on a conventional ice chest cooler top while allowing for unimpeded accessibility to the cooler in a manner which is quick, easy, and efficient.

SUMMARY OF THE INVENTION

Therefore, it is an object of the present invention to provide a cutting and fillet board adapted for use with various models of IGLOO® ice chest coolers.

It is another object of the present invention to provide a cutting and fillet board adapted for removable attachment to a conventional IGLOO® ice chest cooler.

It is another object of the present invention to provide a cutting and fillet board fabricated of marine grade polymer, thereby serving as a very durable and desirable surface against which to cut and fillet fish.

It is another object of the present invention to provide a cutting and fillet board with a board member having a raised peripheral wall integrally molded therewith which encloses three sides of the board member.

It is another object of the present invention to provide a board member with an upper surface defined as a generally smooth filleting surface.

It is another object of the present invention to provide drainage portals located in rear corners of the board member for facilitating drainage from the filleting surface.

It is still another object of the present invention to provide drain plugs which are removably inserted within respective drainage portals in order to prevent drainage onto the ice chest cooler top.

It is another object of the present invention to provide an attachment means for facilitating removable attachment of the cutting and fillet board to an upper surface of an ice chest cooler top of a conventional IGLOO® ice chest cooler.

It is another object of the present invention to provide a cutting instrument retention means to allow for the temporary storage of a desired cutting instrument.

Briefly described according to one embodiment of the present invention, a cutting and fillet board with drain is adapted for removable attachment to a conventional IGLOO® ice chest cooler and other similar ice chest coolers. The present invention comprises a flat, planar, generally rectangular board member having a raised peripheral wall integrally molded therewith which encloses three sides of the board member. The cutting and fillet board with drain is fabricated of a high-density polymer which serves to provide a durable and desirable surface against which to cut and fillet fish.

The board member has an upper surface opposite a lower surface. The upper surface is defined as a generally smooth filleting surface designed for use during cutting, cleaning, and filleting fish.

The peripheral wall defines a rear wall which perpendicularly joins a first and a second sidewall.

Rectangular strips of VELCRO® are adhered to the lower surface of the board member in order to mate with corresponding strips of VELCRO® which are adhered to the upper surface of an ice chest cooler top, thereby removably attaching the cutting and fillet board with drain to an IGLOO® ice chest cooler.

A pair of drainage portals are located in rear corners of the board member for facilitating drainage from the filleting surface. Drain plugs are removably inserted within respective drainage portals in order to prevent drainage onto the ice chest cooler top.

A cutting instrument retention means is mounted laterally along an external surface of second sidewall for providing temporary storage of a desired cutting instrument.

The use of the present invention allows one to cut and fillet fish on a conventional ice chest cooler top while allowing for unimpeded accessibility to the cooler in a manner which is quick, easy, and efficient.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

1. Detailed Description of the Figures

Figure 1:
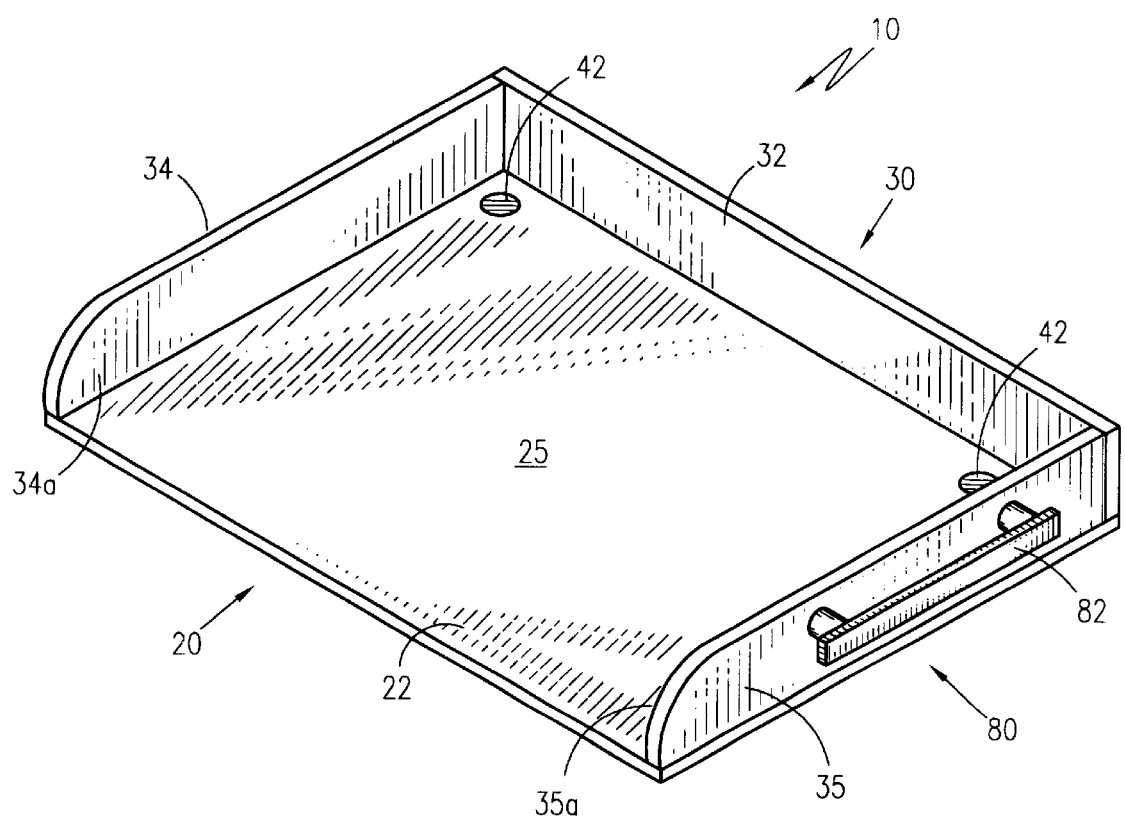
FIG. 1 is a perspective view of a cutting and fillet board with drain for removable attachment to conventional ice chest coolers, according to the preferred embodiment of the present invention.

Referring now to FIGS. 1–4 and 7, a cutting and fillet board with drain 10 is shown, according to the present invention, adapted for removable attachment to a conventional IGLOO® ice chest cooler 12 and other similar ice chest coolers. For purposes of this disclosure, it is envisioned that the present invention as heretofore and henceforth described, is available in various sizes so as to be adaptable for use with various models of IGLOO® ice chest coolers 12 manufactured by Igloo Products Corp., presently owned by Westar Capital LLC, headquartered in Costa Mesa, Calif. Specifically, it is envisioned that the present invention is available in sizes measuring 24 inches×16 inches, 30 inches×16 inches, and 40 inches×16 inches.

The present invention comprises a flat, planar, generally rectangular board member 20 having a raised peripheral wall 30 integrally molded therewith which encloses three sides of the board member 20. It is envisioned that the cutting and fillet board with drain 10 is fabricated of a relatively lightweight, yet rigid and impenetrable material so as to facilitate durability when used as a cutting/fillet board. Preferably, the present invention is fabricated of a high-density polymer, specifically high-density polyethylene. High-density polyethylene serves as a very durable and desirable surface against which to cut and fillet fish.

The board member 20 has an upper surface 22 opposite a lower surface 24. The upper surface 22 is defined as a generally smooth filleting surface 25 designed for use during cutting, cleaning, and filleting fish.

The peripheral wall 30 defines a rear wall 32 which perpendicularly joins a first sidewall 34 which is aligned parallel with a second sidewall 35. The first sidewall 34 and the second sidewall 35 decline slightly downward from a forward end 34a, 35a of each respective sidewall 34, 35 towards the filleting surface 25.

In order to removably attach the cutting and fillet board with drain 10 to an IGLOO® ice chest cooler 12 or similar ice chest cooler, an attachment means 49 comprising a pair of linearly elongated, rectangular VELCRO® strips 50 are vertically adhered in a parallel manner to the lower surface 24 of board member 20. A corresponding pair of linearly elongated, rectangular VELCRO® strips 60 are vertically adhered in a parallel manner to an upper surface of an ice chest cooler top 16. VELCRO® strips 50 comprise the hook portion of a hook and loop fastener, while VELCRO® strips 60 comprise the loop portion. Thus, VELCRO® strips 50 are configured to mate with VELCRO® strips 60, thereby facilitating removable attachment of the cutting and fillet board with drain 10 to the upper surface of an ice chest cooler top 16 of a conventional IGLOO® ice chest cooler 12.

The attachment means described herein for effectuating removable attachment of the present invention to an ice cooler is not intended to be a limiting factor, as it is recognized that other attachment methods such as snap fastening may be utilized and equally effective. However, VELCRO® strips 50, 60 are the preferred method of attachment.

Figure 5:
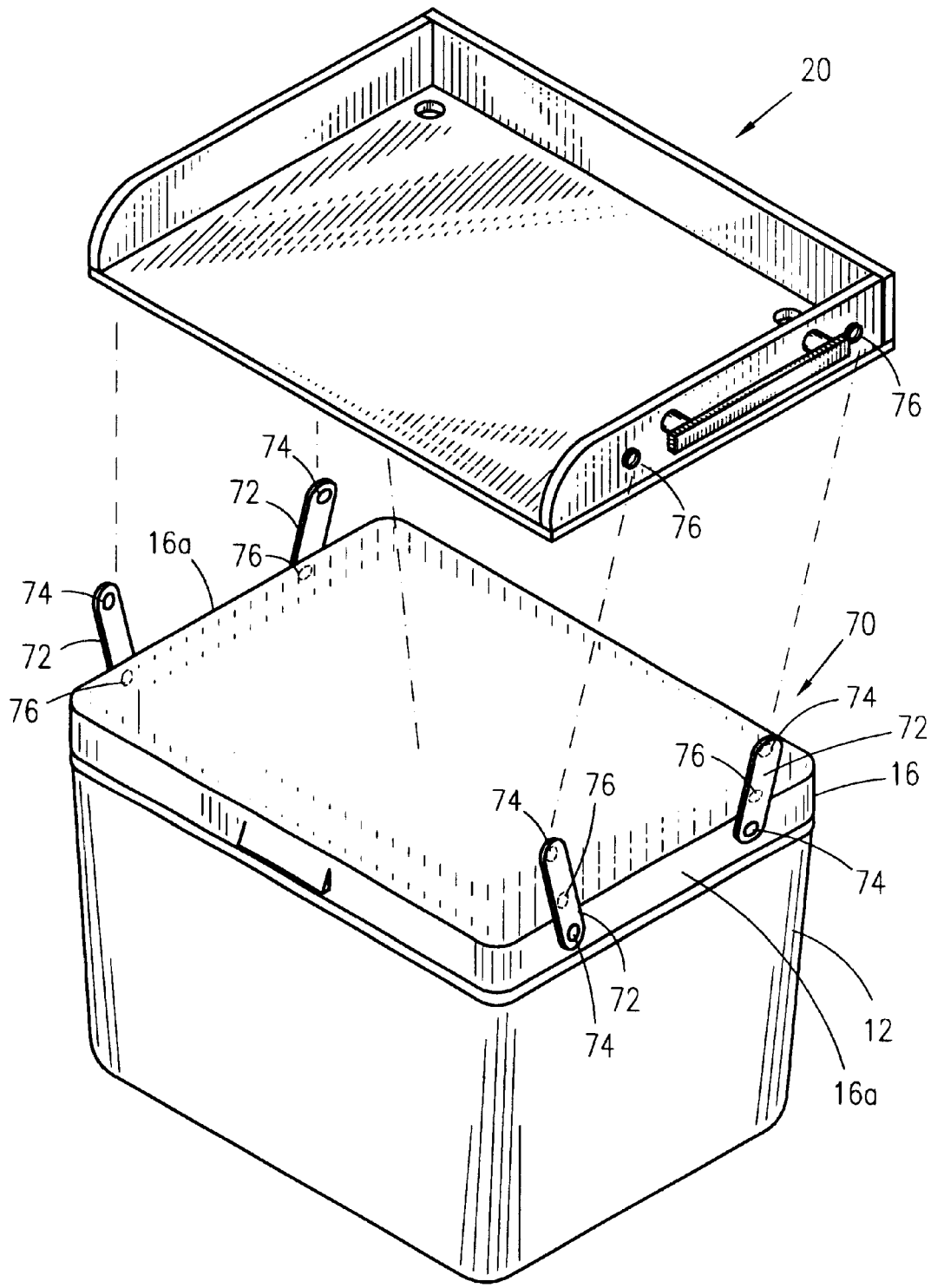
FIG. 5 is an exploded perspective view showing board member's attachment to an ice chest cooler top utilizing strap fasteners.
Figure 6A:
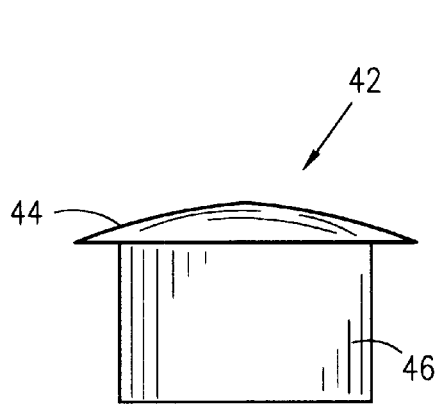
FIG. 6a illustrates a side elevational view of a drain plug according to the preferred embodiment of the present invention.
Figure 6B:
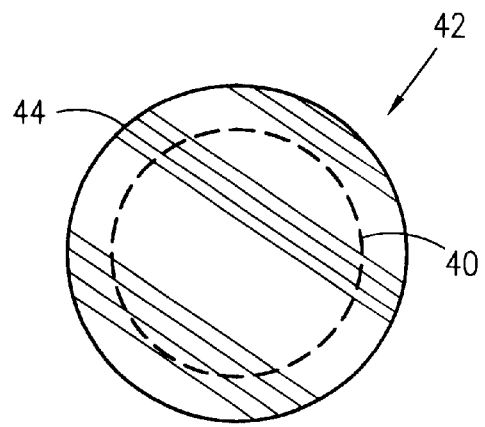
FIG. 6b illustrates a top plan view of the drain plug according to the preferred embodiment of the present invention.
Figure 6C:
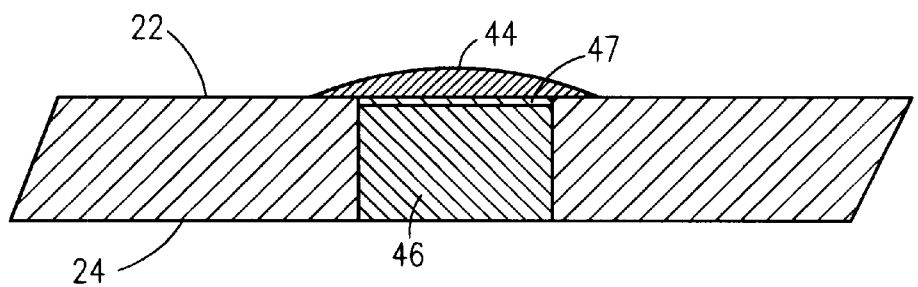
FIG. 6c is a cross-sectional view of a drain plug shown inserted within a drainage portal according to the preferred embodiment of the present invention.
Figure 7:
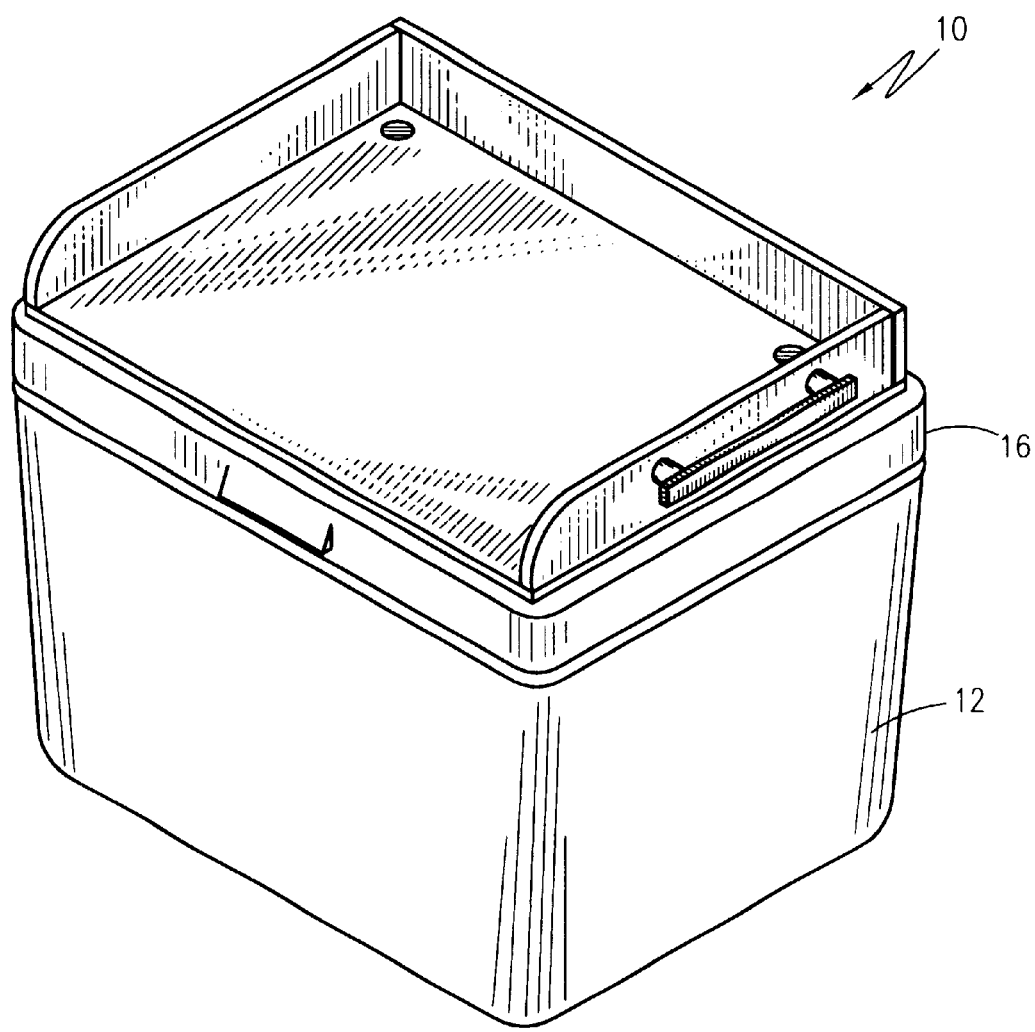
FIG. 7 is a perspective view of the present invention shown attached to a conventional IGLOO® ice chest cooler according to the preferred embodiment of the present invention.

As shown in FIG. 5, the snap fastener 70 is defined as a plurality of linearly elongated, oblong plastic strips 72, wherein each strip 72 has a series of female fasteners 74 designed to mate with a plurality of male fasteners 76. The plurality of male fasteners 76 are mounted along opposing lateral sidewalls 16a of an ice chest cooler top 16 and corresponding male fasteners 76 are mounted along the first sidewall 34 and the second sidewall 35 of board member 20. The female fasteners 74 of strips 72 are designed and configured so as to mate with both the series of male fasteners 76 located along the respective sidewalls 34, 35 of board member 20 and the lateral sidewalls 16a of ice chest cooler top 16, thereby removably attaching the cutting and fillet board with drain 10 to an IGLOO® ice chest cooler 12.

Referring now to FIGS. 2, 3, 6b, and 7, located in rear corners of the board member 20 are a pair of drainage portals 40. The pair of drainage portals 40 facilitate drainage from the filleting surface 25. It is envisioned that each drainage portal 40 has a diameter measuring approximately 1½ inches.

Referring more specifically to FIGS. 1, and 6a–6c, in order to prevent drainage onto the ice chest cooler top 16, drain plugs 42 are removably inserted within respective drainage portals 40, whereby the drain plugs 42 are held therein via frictional interference-type fit. Each drain plug 42 has a circular, slightly convex head 44 perpendicularly supported by a stem 46. A washer 47 is also provided to facilitate formation of a tight seal, thereby preventing leakage. It is envisioned that the drain plugs 42 are fabricated of nylon; however, other equally suitable construction materials such as a semi-rigid plastic material may be utilized.

Being just slightly convex in shape, the head 44 of each drain plug 42 provides for a substantially flat and smooth filleting surface 25 after insertion of each drain plug 42 within a respective drainage portal 40. The drain plugs 42 not only prevent unwanted drainage onto the ice chest cooler, but also provide user preference regarding when and where to enable drainage.

Figure 2:
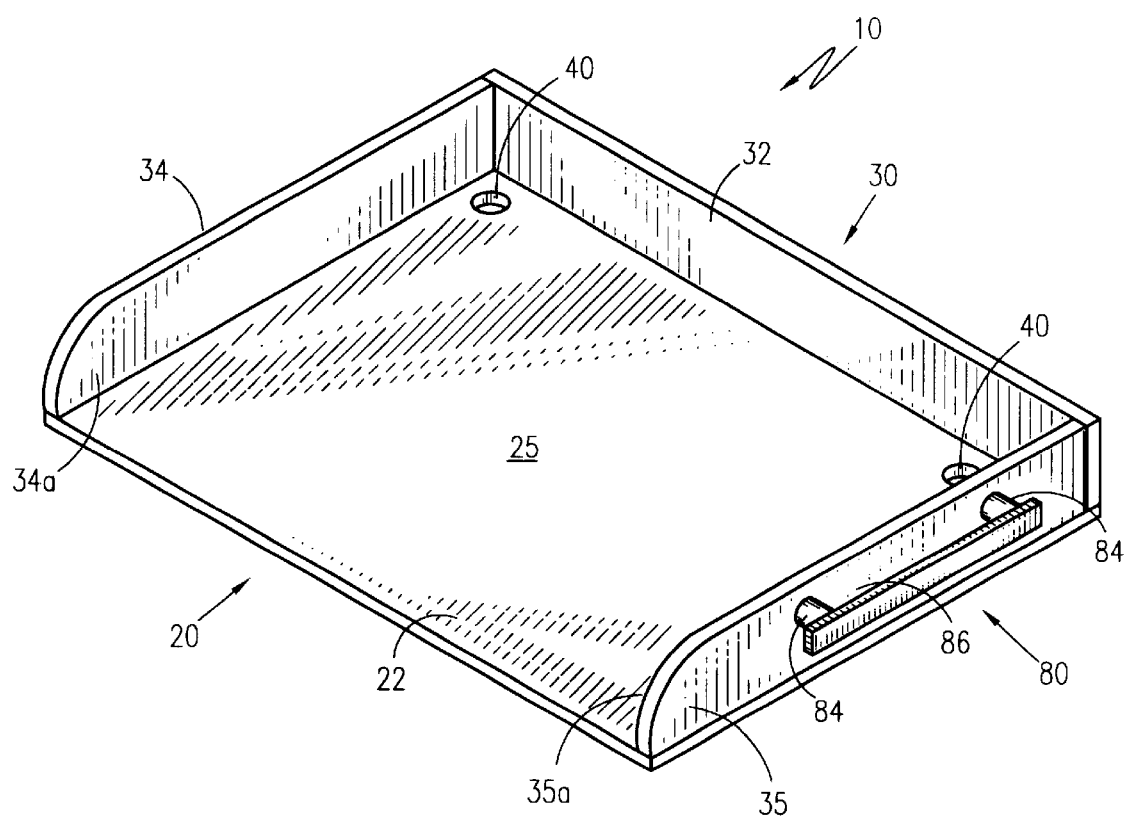
FIG. 2 is a perspective view of the cutting and fillet board with drain shown with drain plugs removed so as to reveal drainage portals according to the preferred embodiment of the present invention.
Figure 3:
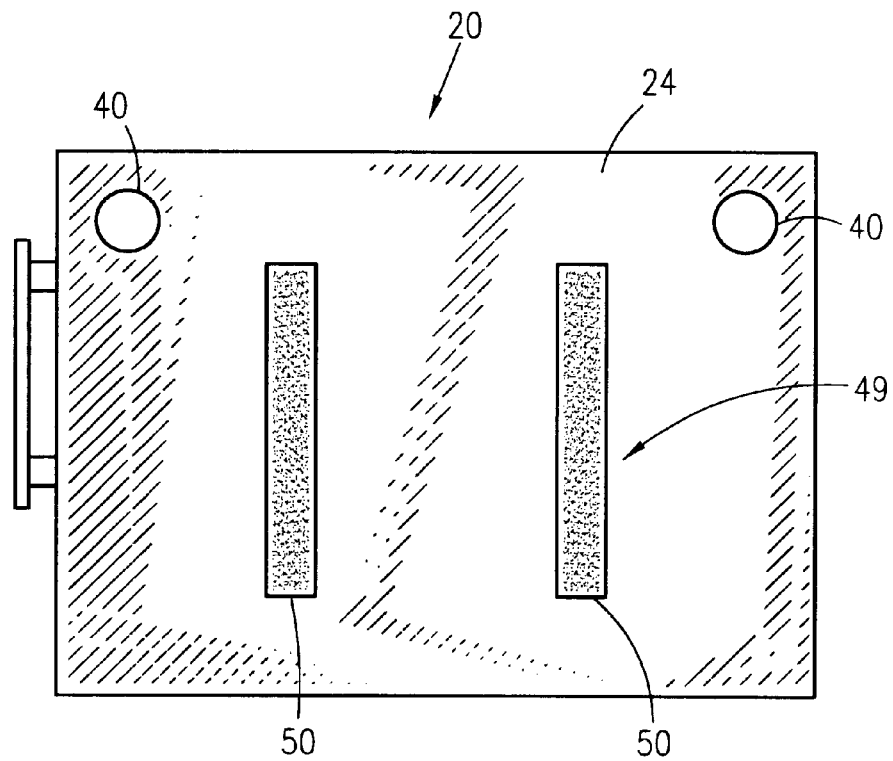
FIG. 3 is a bottom plan view of the board member showing VELCRO® strips adhered thereto.
Figure 4:
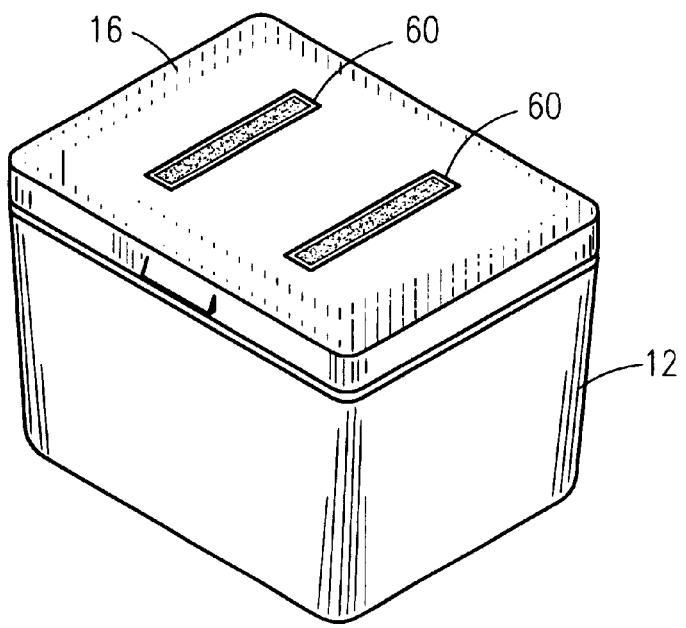
FIG. 4 is a top side view of an ice chest cooler top with corresponding VELCRO® strips adhered thereto.

Referring now to FIGS. 1 and 2, a cutting instrument retention means 80 is mounted laterally along an external surface of second sidewall 35. The cutting instrument retention means 80 is defined as an elongated, flat, oval-shaped member 82 which is mounted to the second sidewall 35 via a pair of mounting posts 84, thereby forming a cutting instrument receptacle 86 for temporary storage of a desired cutting instrument.

Figure 8:
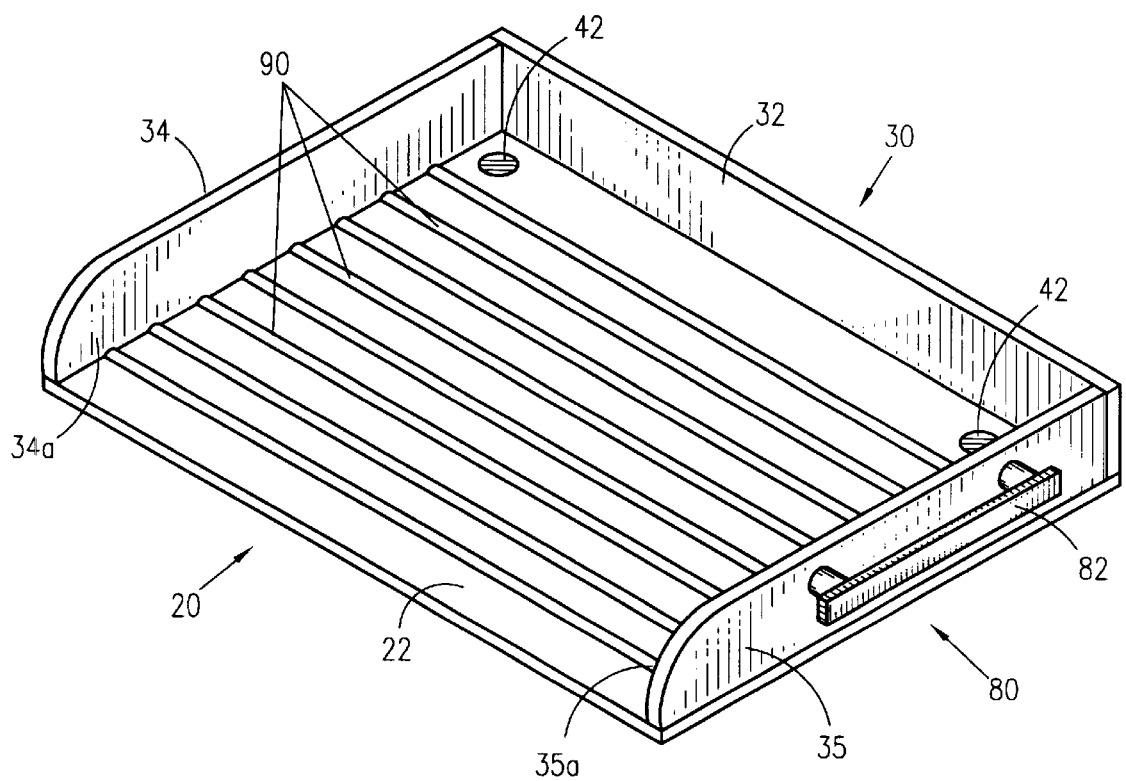
FIG. 8 shows an alternate embodiment of the present invention.

Finally, referring to FIG. 8, an alternate embodiment of the present invention is shown, wherein a non-slip material 90, such as ribbed plastic, is attached to the upper surface 22 of the board member 20. The non-slip material 90 covers an entire surface area uniformly distributed about the upper surface 22. The non-slip material 90 is designed to reduce lateral movement of fish placed thereon to be cleaned during the removal of fillets therefrom.

2. Operation of the Preferred Embodiment

To use the present invention, user simply removably attaches the lower surface 24 of the board member 20 to the upper surface of an ice chest cooler top 16 via VELCRO® strips 50, 60, respectively. Next, user inserts each drain plug 42 within a respective drainage portal 40, thereby preventing drainage onto the ice chest cooler top 16. User is then ready to begin cutting and filleting fish. Upon completion of cleaning and filleting fish, or whenever user desires, user detaches the lower surface 24 of the board member 20 from the upper surface of the ice chest cooler, and removes the drain plugs 42 so as to facilitate drainage from the filleting surface 25.

The use of the present invention allows one to cut and fillet fish on a conventional ice chest cooler top while allowing for unimpeded accessibility to the cooler in a manner which is quick, easy, and efficient.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. Therefore, the scope of the invention is to be broadly limited only by the following claims.

What is claimed is:

1. A cutting and fillet board comprising:
    a board member, said board member is of a flat, planar, generally rectangular configuration, and wherein said board member is adapted for removable attachment to an upper surface of an ice chest cooler top of an IGLOO® ice chest cooler;
    a raised peripheral wall, said raised peripheral wall is integrally molded with said board member, wherein said raised peripheral wall encloses three sides of said board member;
    an attachment means, said attachment means facilitates removable attachment of said board member to said upper surface of said ice chest cooler top of said IGLOO® ice chest cooler;
    a pair of drainage portals;
    drain plugs; and
    a cutting instrument retention means.

2. The cutting and fillet board of claim 1, wherein said board member and said raised peripheral wall are fabricated of a lightweight, rigid and impenetrable material so as to facilitate durability when used as a cutting/fillet board.

3. The cutting and fillet board of claim 1, wherein said board member has an upper surface opposite a lower surface, wherein said upper surface is defined as a generally smooth filleting surface designed for use during cutting, cleaning, and filleting fish.

4. The cutting and fillet board of claim 1, wherein said peripheral wall defines a rear wall which perpendicularly joins a first sidewall and a second sidewall, said first sidewall is aligned parallel with said second sidewall, and wherein said first sidewall and said second sidewall decline slightly downward from a forward end of said first sidewall and a forward end of said second sidewall towards said filleting surface.

5. The cutting and fillet board of claim 1, wherein said attachment means comprises:
    a pair of linearly elongated, rectangular VELCRO® strips, said pair of linearly elongated, rectangular VELCRO® strips are vertically adhered in a parallel manner to said lower surface of said board member; and
    a corresponding pair of linearly elongated, rectangular VELCRO® strips, said corresponding pair of linearly elongated, rectangular VELCRO® strips are vertically adhered in a parallel manner to said upper surface of said ice chest cooler top, whereby said pair of linearly elongated, rectangular VELCRO® strips are designed and configured to mate with said corresponding pair of linearly elongated, rectangular VELCRO® strips, thereby facilitating removable attachment of said board member to said upper surface of said ice chest cooler top of said IGLOO® ice chest cooler.

6. The cutting and fillet board of claim 1, wherein said attachment means comprises a snap fastener, said snap fastener is defined as a plurality of linearly elongated, oblong plastic strips, wherein each of said strips has a series of female fasteners designed to mate with a plurality of male fasteners, said plurality of male fasteners are mounted along opposing lateral sidewalls of said ice chest cooler top and a corresponding plurality of male fasteners are mounted along said first sidewall and said second sidewall of said board member, and wherein said female fasteners mate with said plurality of male fasteners located along said board member and said ice chest cooler top, thereby removably attaching said cutting and fillet board with drain to said IGLOO® ice chest cooler.

7. The cutting and fillet board of claim 1, wherein said pair of drainage portals are located in rear corners of the board member, and wherein said pair of drainage portals facilitate drainage from said filleting surface.

8. The cutting and fillet board of claim 7, wherein each drainage portal of said pair of drainage portals has a diameter measuring approximately 1½ inches.

9. The cutting and fillet board of claim 1, wherein said drain plugs are removably inserted within respective said pair of drainage portals in order to prevent drainage onto said ice chest cooler top, said drain plugs are held within said pair of drainage portals via frictional interference-type fit.

10. The cutting and fillet board of claim 9, wherein said drain plugs are defined as having a circular, slightly convex head being perpendicularly supported by a stem, said drain plugs include a washer to facilitate formation of a tight seal, thereby preventing leakage.

11. The cutting an fillet board of claim 10, wherein said drain plugs are fabricated of nylon.

12. The cutting an fillet board of claim 1, wherein said cutting instrument retention means is mounted laterally along an external surface of second sidewall, said cutting instrument retention means includes an elongated, flat, oval-shaped member mounted to said second sidewall via a pair of mounting posts, thereby forming a cutting instrument receptacle for temporary storage of a desired cutting instrument.

13. A cutting and fillet board comprising:

a board member, said board member is of a flat, planar, generally rectangular configuration having a non-slip material attached to an upper surface of said board member, said non-slip material covers an entire surface area uniformly distributed about said upper surface, and wherein said board member is adapted for removable attachment to an upper surface of an ice chest cooler top of an IGLOO® ice chest cooler;

a raised peripheral wall, said raised peripheral wall is integrally molded with said board member, wherein said raised peripheral wall encloses three sides of said board member;

an attachment means, said attachment means facilitates removable attachment of said board member to said upper surface of said ice chest cooler top of said IGLOO® ice chest cooler;

a pair of drainage portals;

drain plugs; and a cutting instrument retention means.

* * * * *